US010920130B2

(12) United States Patent
Nguyen et al.

(10) Patent No.: US 10,920,130 B2
(45) Date of Patent: Feb. 16, 2021

(54) DOWNHOLE METHODS FOR FORMING RESIN COATINGS ON FRACTURE SURFACES

(71) Applicant: HALLIBURTON ENERGY SERVICES, INC., Houston, TX (US)

(72) Inventors: Philip D. Nguyen, Houston, TX (US); Loan K. Vo, Houston, TX (US); Rajender Salla, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/495,992

(22) PCT Filed: Apr. 21, 2017

(86) PCT No.: PCT/US2017/028841
§ 371 (c)(1),
(2) Date: Sep. 20, 2019

(87) PCT Pub. No.: WO2018/194654
PCT Pub. Date: Oct. 25, 2018

(65) Prior Publication Data
US 2020/0048536 A1 Feb. 13, 2020

(51) Int. Cl.
*E21B 33/138* (2006.01)
*C09K 8/68* (2006.01)
(Continued)

(52) U.S. Cl.
CPC .................. *C09K 8/68* (2013.01); *C09K 8/80* (2013.01); *E21B 33/138* (2013.01); *E21B 43/267* (2013.01)

(58) Field of Classification Search
CPC ........... C09K 8/68; C09K 8/80; E21B 33/138; E21B 43/267
See application file for complete search history.

(56) References Cited

U.S. PATENT DOCUMENTS

| 4,732,213 A | 3/1988 | Bennett et al. |
| 6,668,926 B2 | 12/2003 | Nguyen et al. |
(Continued)

FOREIGN PATENT DOCUMENTS

WO 2013155307 A2 10/2013

OTHER PUBLICATIONS

Larsen, Jan, et al., "Plugging of Fractures in Chalk Reservoirs by Enzyme-Induced Calcium Carbonate Precipitation", Scotian, U.K., Sep. 2007, SPE 108589, 6 pages.
(Continued)

*Primary Examiner* — Silvana C Runyan
(74) *Attorney, Agent, or Firm* — Chamberlain Hrdlicka

(57) ABSTRACT

Methods for producing a coating on a fracture surface within a subterranean formation are provided. A pad fluid is injected or introduced into a wellbore to form a primary fracture in the subterranean formation and a coating fluid is injected or introduced into the primary fracture to form secondary fractures in the subterranean formation. The coating fluid is flowed into the secondary fractures to expose nucleation surfaces on the secondary fractures to the coating fluid and to produce a resin coating on the nucleation surfaces. Conductive flow paths are formed on and/or within the resin coating. Hydrocarbons can be retrieved from the subterranean formation via the conductive flow paths within the secondary fractures. A viscosity of the pad fluid is greater than a viscosity of the coating fluid and the coating fluid contains or includes a resin, a curing agent, a surfactant, and an organic solvent.

20 Claims, 3 Drawing Sheets

(51) Int. Cl.
*C09K 8/80* (2006.01)
*E21B 43/267* (2006.01)

(56) References Cited

U.S. PATENT DOCUMENTS

| | | |
|---|---|---|
| 6,729,404 B2 | 5/2004 | Nguyen et al. |
| 6,877,560 B2 | 4/2005 | Nguyen et al. |
| 6,962,200 B2 | 11/2005 | Nguyen et al. |
| 7,553,362 B2 | 6/2009 | Lu et al. |
| 7,810,562 B2 | 10/2010 | Tu et al. |
| 8,993,112 B2 | 3/2015 | Elder et al. |
| 10,408,033 B2* | 9/2019 | Ehlig-Economides ............ E21B 47/12 |
| 2005/0274523 A1 | 12/2005 | Brannon et al. |
| 2006/0089266 A1 | 4/2006 | Dusterhoft et al. |
| 2006/0113078 A1 | 6/2006 | Nguyen et al. |
| 2007/0043202 A1 | 2/2007 | Yaszemski et al. |
| 2009/0159287 A1 | 6/2009 | Tu et al. |
| 2015/0068747 A1* | 3/2015 | Hwang ............ C09K 8/685 166/280.2 |
| 2016/0053160 A1 | 2/2016 | Nguyen et al. |
| 2016/0137910 A1 | 5/2016 | Chang et al. |
| 2016/0289543 A1 | 10/2016 | Chang |
| 2016/0333249 A1 | 11/2016 | Patil et al. |
| 2018/0238155 A1* | 8/2018 | Nguyen ............ E21B 43/26 |
| 2018/0245443 A1* | 8/2018 | Nguyen ............ E21B 47/06 |

OTHER PUBLICATIONS

Chang, Frank F., et al., "In-Situ Formation of Proppant and Highly Permeable Blocks for Hydraulic Fracturing", The Woodlands, Texas, Feb. 2015, SPE 173328-MS, 11 pages.

International Search Report and Written Opinion dated Jan. 15, 2018 for PCT Application No. PCT/US2017/028841 filed Apr. 21, 2017 (12 pages).

* cited by examiner

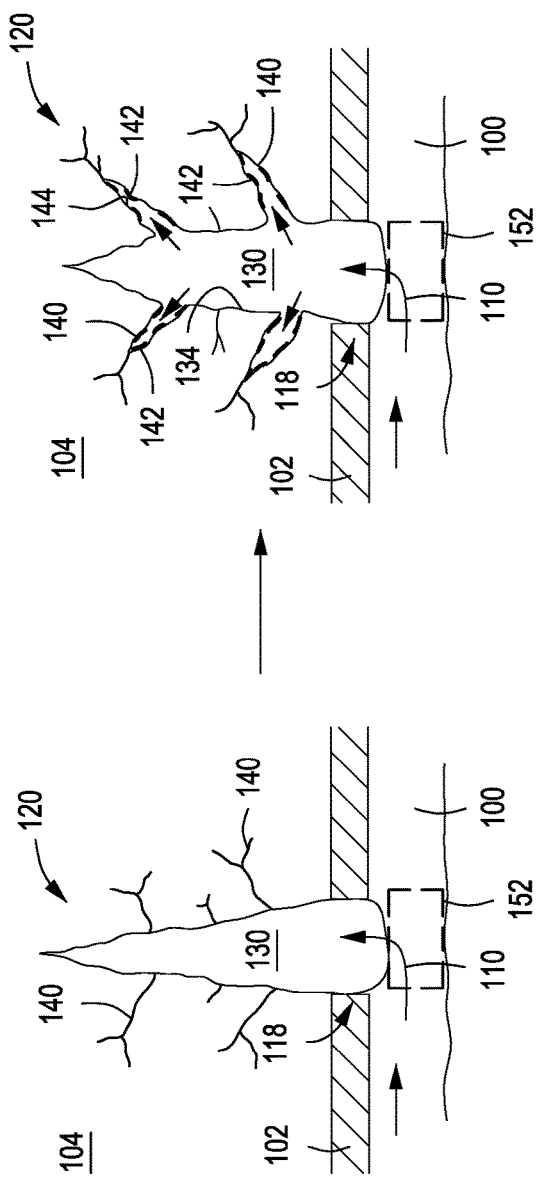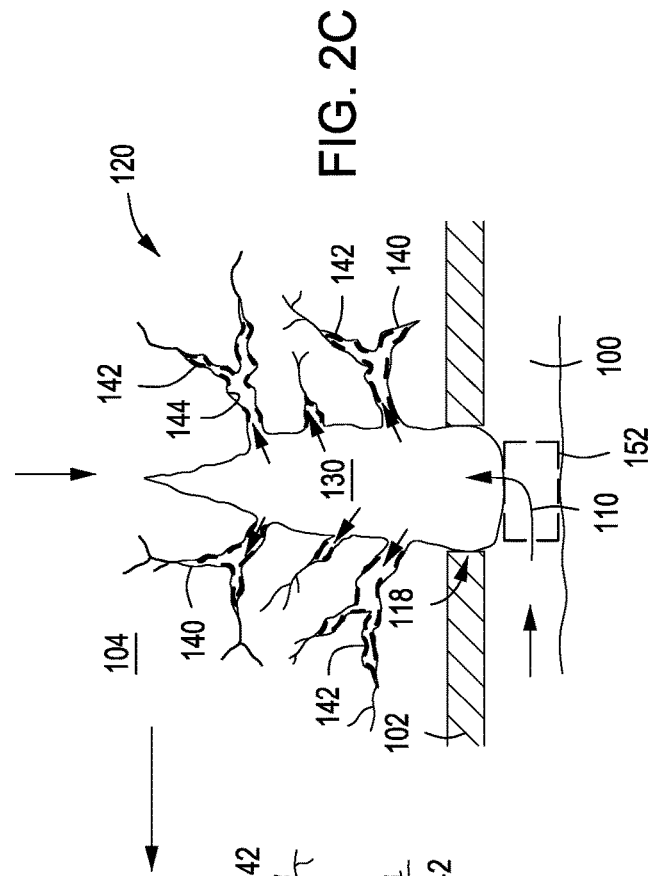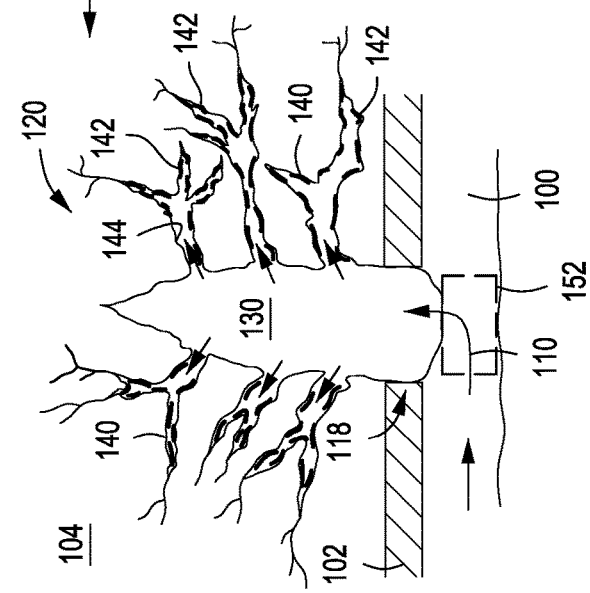
FIG. 2A  FIG. 2B  FIG. 2C  FIG. 2D

DOWNHOLE METHODS FOR FORMING RESIN COATINGS ON FRACTURE SURFACES

BACKGROUND

This section is intended to provide relevant background information to facilitate a better understanding of the various aspects of the described embodiments. Accordingly, it should be understood that these statements are to be read in this light and not as admissions of prior art.

Hydraulic fracturing is a stimulation process to form high-conductivity communication with a large area of a subterranean formation. The stimulation process can increase hydrocarbon production from the subterranean formation, as well as the efficiency of such hydrocarbon production. Therefore, it will be appreciated that improvements are continually needed in the hydraulic fracturing of subterranean formations.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIGS. 2A-2D depict schematic views of an exemplary fracture system containing near field primary fractures and far field secondary fractures at different intervals of a fracturing treatment, according to one or more embodiments;

DETAILED DESCRIPTION

Figure 1:
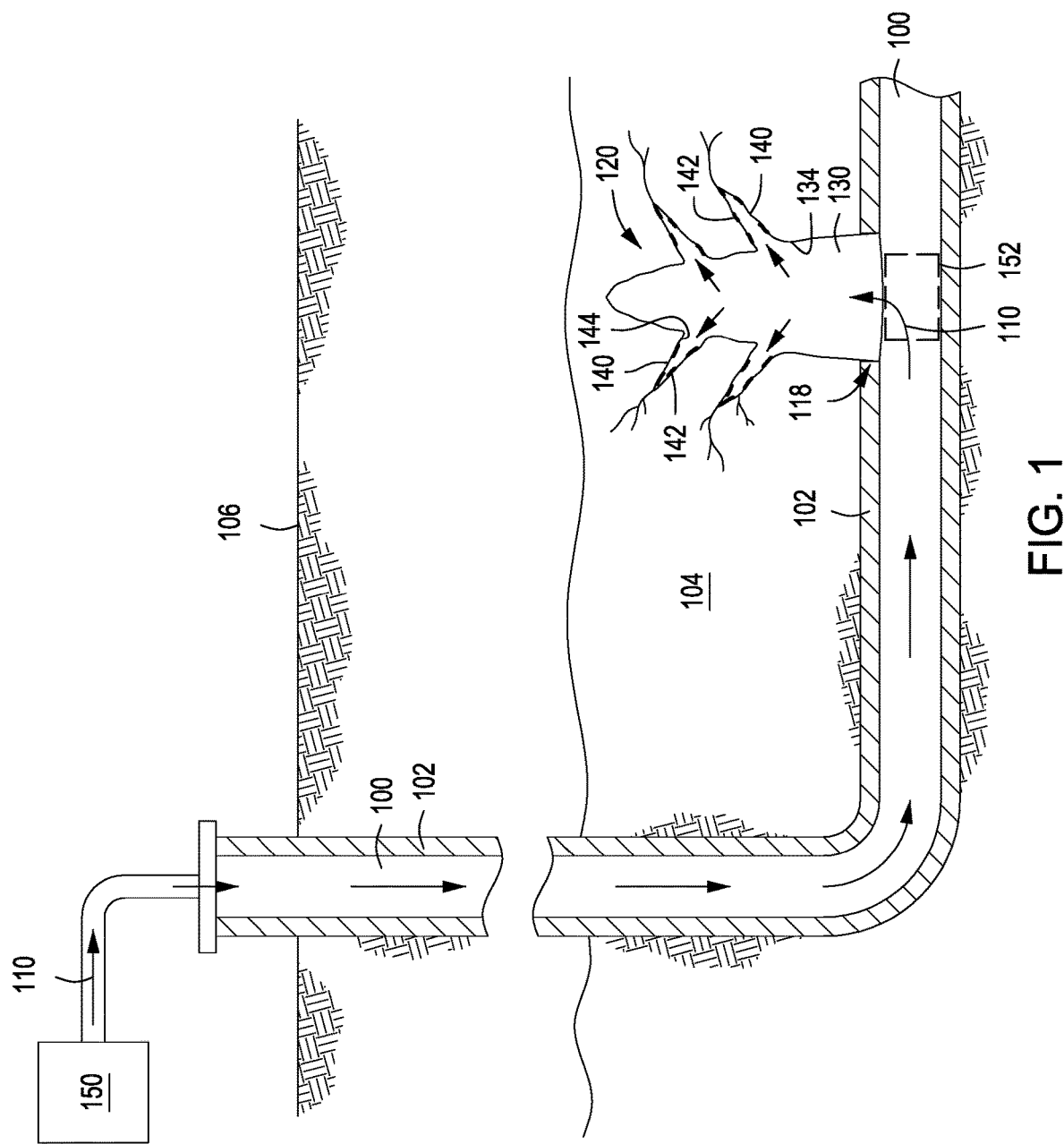
FIG. 1 depicts a schematic view of a wellbore located in a subterranean formation containing a coating fluid being introduced into a fracture system containing near field primary fractures and far field secondary fractures, according to one or more embodiments.

FIG. 1 depicts a schematic view of a wellbore 100 located in a subterranean formation 104. The wellbore 100 contains one or more tubulars and/or casings 102 and the subterranean formation 104 can have one, two, or more fracture systems 120 located therein. The wellbore 100 extends throughout the subterranean formation 104, such as between a surface 106 of the subterranean formation 104 to any of the fracture systems 120 located in the subterranean formation 104. The fracture systems 120 are in fluid communication with the wellbore 100 via one or more perforations 118 passing through the casing 102. Each fracture system 120 includes one or more near field primary fractures 130 and one or more far field secondary fractures 140.

The rock matrix of the subterranean formation 104 is of a type that when fractured, produces both of the near field primary fractures 130 and the far field secondary fractures 140. The far field secondary fractures 140 can have propagated from or near the ends, edges, and/or surfaces of the near field primary fracture 130. In certain instances, the subterranean formation 104 can be a low permeability zone having a permeability of 1 millidarcy (mD) or less. For example, the subterranean formation 104 can be or include shale. In certain instances, the rock matrix of the subterranean formation 104 can be or include cleating or natural fractures (e.g., those that existed prior to, and were not caused by, a fracture treatment). The natural fractures tend to run in one or more directions parallel to the near field primary fracture 130. The far field secondary fractures 140 may run in many directions including directions non-parallel and, in certain instances, perpendicular to the direction of the near field primary fracture 130. As a result, the far field secondary fracture 140 cross, and thereby link, the natural fractures to the near field primary fracture 130.

FIG. 1 shows a stimulation treatment system 150 that is used to pump, transfer, inject, pressurize, or otherwise introduce one or more fracturing fluids, such as a pad fluid and/or a coating fluid, into the subterranean formation 104, in accordance with one or more embodiments. The stimulation treatment system 150 includes one or more flow control devices 152 located within the wellbore 100, as shown, and/or located on the surface 106 of the subterranean formation 104 outside and adjacent to the wellbore 100, not shown. FIG. 1 depicts the stimulation treatment system 150 in fluid communication, adjacent to, or otherwise nearby the perforations 118 and/or of the fracture system 120 within the wellbore 100. A portion of the stimulation treatment system 150 can be or include, but is not limited to, one or more containers, mixers, pumps, conduits, control modules, and/or other devices and can be located on the surface 106. The flow control device 152 can be or include, but is not limited to, one or more valves (e.g., bypass valves), ports, regulators, or other tools or devices that control a flow of fluid into the subterranean formation 104 and/or into the fracture system 120. In some examples, one or more containers and/or mixers (not shown) can be used to combine and/or mix components to produce or otherwise form one or more fluids, such as at least one of a pad fluid, a fracturing fluid, a coating fluid, or combinations thereof. Also, one or more pumps (not shown) can be configured to pump, inject, or otherwise introduce at least one of a pad fluid, a fracturing fluid, a coating fluid, or combinations thereof into the subterranean formation 104 through the tubulars and/or casings 102 in the wellbore 100.

In one or more embodiments, a method for fracturing and stimulating a subterranean formation 104 by producing a resin coating 142 on fracture nucleation surfaces 144 of far field secondary fractures 140 and propping open the secondary fractures 140 with the resin coating 142. The pad fluid (not shown) is injected or otherwise introduced into the wellbore 100 to form one or more primary fractures 130 in the subterranean formation 104. Simultaneously and/or subsequently, the coating fluid (depicted by arrows 110) is injected or otherwise introduced into the primary fracture 130 to form the secondary fractures 140 in the subterranean formation 104. The coating fluid 110 is flowed or introduced into the secondary fractures 140 and exposed the nucleation surfaces 144 on the secondary fractures 140 to the coating fluid 110. One or more resin coatings 142 are produced or otherwise formed on the nucleation surfaces 144. Each of resin coatings 142 contains one or more conductive flow paths (not shown) formed within the resin coating 142 or between two or more clusters or films of the resin coatings 142. For example, the resin coating 142 can have one or more bumps or ridges with the conductive flow path disposed therebetween and/or one or more canals or passageways with the conductive flow path passing therethrough. Once the secondary fractures 140 are formed and propped open via the resin coating 142, the method includes retrieving, flowing, or otherwise passing one or more hydrocarbons from the subterranean formation 104 via the conductive flow paths within the secondary fractures 140. The hydrocarbons are flowed over and/or through the resin coating 142 along the secondary fractures 140, and then through the primary fracture 130 and the wellbore 100 for further processing.

Hydraulic fracturing stimulation forms or produces primary fractures in the near field (e.g., the near field primary fracture 130) around the wellbore 100 and induces dendritic fractures in the far field (e.g., far field secondary fractures 140). The dendritic fractures are generally formed at the tips and/or the edges of the primary fractures, and extend outwardly in a branching manner. The secondary, dendritic fractures extend transversely to the trajectory of the primary fractures and reach and link natural fractures both in and adjacent to the trajectory of the primary fractures. As such, the far field secondary fractures 140 reach a larger portion of the naturally occurring fracture network, and link the natural fractures back to the primary fractures 130 and to the wellbore 100.

The hydraulic fracturing treatments use different types of treatment fluid (e.g., composition and density) and changes in pump rate during hydraulic fracturing to vary the stress/pressure being applied to the rock and/or portions of the subterranean formation 104. The flowrate of the coating fluid can be increased, therefore the pressure is increased, as needed to propagate the far field secondary fractures 140 and to increase production stimulation of the subterranean formation 104. The increased hydraulic pressures caused by the pad fluid and/or the coating fluid effect the rock, which increases the likely hood of failure occurring due to fatigue in the subterranean formation 104. Shale, coal, and other low permeability formations, for example, formations having a permeability of approximately 1 mD or less, can fracture in this manner. The methods discussed and described herein include using the resin coating 142 to prop or otherwise hold open the far field secondary fractures 140 or other induced, dendritic fractures, microfractures, and, in certain instances, the linked natural fractures, to improve recovery of hydrocarbons from the formation 104. The subterranean formation 104 with the additionally formed far field secondary fractures 140 that are propped by the resin coating 142 has increased stimulation and production relative to similar formations without the resin coating and rely on traditional proppant or no proppant.

FIGS. 2A-2D depict schematic views of the fracture system 120 containing one or more near field primary fractures 130 and one or more far field secondary fractures 140 at different intervals of a fracturing treatment, according to one or more embodiments. Prior to pumping the coating fluid 110 into the wellbore 100, one or more pad fluids and/or other fracturing fluids are injected, pumped, or otherwise introduced into the wellbore 100. The pad fluid is introduced into the wellbore 100 at an injection pressure that is greater than the fracturing gradient of the subterranean formation 104 to form the near field primary fractures 130. The subterranean formation 104 is stressed and fractured with the pad fluid to form at least the near field primary fracture 130 and can form one or more far field secondary fractures 140.

FIG. 2A depicts the fracture system 120 at an initial or early stage of introducing the coating fluid 110 during the fracturing treatment. The coating fluid 110 flows through the optional flow control device 152, through the casing 102 via the perforation 118, and into at least the near field primary fracture 130. The coating fluid 110 is introduced into the wellbore 100 and the near field primary fracture 130 at an injection pressure that is greater than the fracturing gradient of the subterranean formation 104 to form the far field secondary fractures 140. The coating fluid 110 forms and expands secondary fractures in the subterranean formation 104 from the primary fracture 130. The far field secondary fractures 140 can start forming at faces or surfaces of the near field primary fracture 130 and extend into the subterranean formation 104. If any existing far field secondary fractures 140 are present in the fracture system 120 prior to the introduction of the coating fluid 110, then the coating fluid 110 flows into and further expands the far field secondary fractures 140. As the coating fluid 110 flows into the far field secondary fractures 140, the nucleation surfaces 144 on the far field secondary fractures 140 are exposed to the coating fluid 110 and the resin coating 142 is formed, produced, or otherwise coated on the nucleation surfaces 144 to prop open the far field secondary fractures 140.

FIGS. 2B-2D depict the formation and expansion of the far field secondary fractures 140 throughout the fracture system 120 within the subterranean formation 104. Also, the resin coating 142 is progressively formed to assist in the formation and expansion of the far field secondary fractures 140 by providing the conductive flow paths for the hydraulic pressure exerted by the coating fluid 110. The conductive flow paths across and/or through the resin coating 142 further provide access for the hydrocarbons to be retrieved from the subterranean formation 104.

The flow rate of the coating fluid 110 is proportional to the downhole pressures in the near field primary fracture 130 and the far field secondary fractures 140. Therefore, the flow rate of the coating fluid 110 is increased to increase the downhole pressure, decreased to decrease the downhole pressure, and/or maintained constant or substantially constant to maintain the downhole pressure. By propagating the far field secondary fractures 140, the increased flow rate increases the lengths of the far field secondary fractures 140, increases the sectional areas and/or the openings of the far field secondary fractures 140, and/or forms additional far field secondary fractures 140 within the subterranean formation 104.

Once the far field secondary fractures 140 are formed and production of hydrocarbons is desired, the flow rate of the coating fluid 110 can be decreased which decreases the downhole pressure in at least the near field primary fracture 130 and/or the far field secondary fractures 140. In turn, the far field secondary fractures 140 are propped open by the resin coating 142 that has formed on the nucleation surfaces 144. The conductive flow paths on and/or in the resin coating 142 provide pathways for the removal of hydrocarbons from the subterranean formation 104. Without the resin coating 142 disposed on the surfaces of the far field secondary fractures 140, the far field secondary fractures 140 would reduce in size, such as less sectional area and/or smaller openings and length, or completely close, thereafter, removal of hydrocarbons from the subterranean formation 104 would be reduced or non-existent during production.

The curing of the resin contained within the coating fluid to form the resin coating is a chemically induced reaction with the curing agent. The speed of the reaction, or curing rate, can be adjusted or otherwise controlled by many variables, such as the temperature and/or pressure downhole, the pH of the coating fluid, inclusion of one or more catalysts and/or solvents, or any combination thereof. One or more heaters can be used to heat the coating fluid to a predetermined temperature before introducing the coating fluid into the wellbore and/or maintain the coating fluid at the predetermined temperature while being introduced or within the wellbore. The coating fluid is heated by the natural thermal energy radiated by the subterranean formation 104. As such the coating fluid can be heated by absorbing the natural geothermal energy and/or with one or more supplemental heaters. The coating fluid is heated to and/or maintained at a temperature in a range from about 25° C., about 30° C., about 40° C., or about 50° C. to about 60° C., about 70° C., about 80° C., about 90° C., about 93° C., about 95° C., about 97° C., about 100° C., about 110° C., about 120° C., about 125° C., about 130° C., about 140° C., about 150° C., about 160° C., or greater during curing to produce the resin coating. For example, the coating fluid is heated to and/or maintained at a temperature in a range from about 25° C. to about 160° C., about 25° C. to about 150° C., about 40° C. to about 150° C., about 50° C. to about 150° C., about 60° C. to about 150° C., about 70° C. to about 150° C., about 80° C. to about 150° C., about 100° C. to about 150° C., about 125° C. to about 150° C., about 25° C. to about 125° C., about 40° C. to about 125° C., about 50° C. to about 125° C., about 60° C. to about 125° C., about 70° C. to about 125° C., about 80° C. to about 125° C., about 100° C. to about 125° C., about 25° C. to about 100° C., about 40° C. to about 100° C., about 50° C. to about 100° C., about 60° C. to about 100° C., about 70° C. to about 100° C., about 25° C. to about 95° C., about 40° C. to about 95° C., about 50° C. to about 95° C., about 60° C. to about 95° C., or about 70° C. to about 95° C. during curing to produce the resin coating.

The flow rate of the pad fluid and/or the coating fluid in the wellbore 100 and/or any part of the subterranean formation 104 is independently in a range from about 10 barrels per minute (bpm), about 20 bpm, about 30 bpm, about 40 bpm, about 50 bpm, about 60 bpm, about 70 bpm, about 80 bpm, about 90 bpm, or about 100 bpm to about 120 bpm, about 135 bpm, about 150 bpm, about 165 bpm, about 180 bpm, about 190 bpm, about 200 bpm, or greater. For example, the flow rate of the pad fluid and/or the coating fluid in the wellbore 100 and/or any part of the subterranean formation 104 is independently in a range from about 10 bpm to about 200 bpm, about 20 bpm to about 100 bpm, about 30 bpm to about 100 bpm, about 30 bpm to about 90 bpm, about 60 bpm to about 90 bpm, about 50 bpm to about 90 bpm, about 30 bpm to about 50 bpm, about 30 bpm to about 60 bpm, or about 30 bpm to about 70 bpm.

The pressure within the wellbore 100, such as the bottom hole pressure, is measured or otherwise determined when the pad fluid, the coating fluid, and/or any other fracturing fluid is contained within the wellbore 100, the subterranean formation 104, the fracture system 120, the near field primary fractures 130, and/or the far field secondary fractures 140. The pressure of the wellbore 100 or the bottom hole pressure is in a range from about 500 pounds per square inch (psi), about 1,000 psi, about 2,000 psi, about 3,000 psi, about 4,000 psi, about 5,000 psi, about 6,000 psi, about 7,000 psi, or about 8,000 psi to about 9,000 psi, about 10,000 psi, about 11,000 psi, about 12,000 psi, about 13,000 psi, about 14,000 psi, about 15,000 psi, or greater. For example, the pressure of the wellbore 100 or the bottom hole pressure is in a range from about 500 psi to about 15,000 psi, about 8,000 psi to about 12,000 psi, about 5,000 psi to about 10,000 psi, about 8,500 psi to about 11,000 psi, or about 6,000 psi to about 12,000 psi.

The pad fluid and the coating fluid differ by at least composition and viscosity. The pad fluid is more viscous than the coating fluid, i.e., the viscosity of the pad fluid is greater than the viscosity of the coating fluid, or otherwise stated, the viscosity of the coating fluid is less than the viscosity of the pad fluid. The relative greater viscosity of the pad fluid is useful in forming larger fracture geometries, such as the near field primary fractures 130, and to provide leak-off control. The relative lower viscosity of the coating fluid is useful for getting into the smaller fracture geometries, such as the far field secondary fractures 140, and to be pumped at a faster injection rate thus generating a greater hydraulic pressure.

The viscosity of the pad fluid is typically greater than 5 cps, greater than 20 cps, greater than 50 cps, greater than 100 cps, or greater than 1,000 cps. In one or more examples, the viscosity of the pad fluid is about 5 cps, about 10 cps, about 20 cps, about 30 cps, about 50 cps, about 100 cps, about 200 cps, about 300 cps, or about 500 cps to about 600 cps, about 750 cps, about 1,000 cps, about 1,500 cps, about 2,000 cps, about 3,000 cps, about 5,000 cps, about 7,000 cps, about 10,000 cps, or greater. For example, the viscosity of the pad fluid is in a range from greater than 5 cps to about 10,000 cps, greater than 20 cps to about 10,000 cps, about 50 cps to about 10,000 cps, about 100 cps to about 10,000 cps, about 1,000 cps to about 10,000 cps, greater than 5 cps to about 1,000 cps, greater than 20 cps to about 1,000 cps, about 50 cps to about 1,000 cps, or about 100 cps to about 1,000 cps.

The viscosity of the coating fluid is about 20 cps or less, such as less than 20 cps, less than 18 cps, less than 15 cps, or less than 10 cps. In one or more examples, the viscosity of the coating fluid is about 1 cps, about 2 cps, about 3 cps, about 5 cps, about 6 cps, about 8 cps, or about 10 cps to about 12 cps, about 14 cps, about 15 cps, about 18 cps, or about 20 cps. For example, the viscosity of the coating fluid is in a range about 1 cps to about 20 cps, about 1 cps to about 18 cps, about 1 cps to about 15 cps, about 1 cps to about 12 cps, about 1 cps to about 10 cps, about 1 cps to about 8 cps, about 1 cps to less than 20 cps, about 1 cps to less than 18 cps, about 1 cps to less than 15 cps, about 1 cps to less than 12 cps, about 1 cps to less than 10 cps, or about 1 cps to less than 8 cps.

The viscosity of the pad fluid, the coating fluid, and/or any other compound or composition discussed and described herein can be determined using a viscometer at a temperature of about 25° C. For example, a Brookfield Viscometer, Model DV-II+, with a small sample adapter with, for example, a number 31 spindle, can be used. The small sample adapter can allow a sample to be cooled or heated by the chamber jacket to maintain the temperature of the sample surrounding the spindle at a temperature of about 25° C.

In one or more embodiments, the coating fluid contains or includes one or more resins, one or more curing agents, one or more surfactants, one or more organic solvents, or any combination thereof. The coating fluid can also contain or include water, one or more aqueous solutions, one or more salts, one or more brines, one or more pH adjusting agents (e.g., acidic or caustic agent), or any combination thereof.

The resin can be or include, but is not limited to, bisphenol A, bisphenol F, phenol-aldehyde resin (e.g., phenol-formaldehyde), urea-aldehyde resin (e.g., urea-formaldehyde), epichlorohydrin, bisphenol A-epichlorohydrin resin, bisphenol F-epichlorohydrin resin, novolac resin, polyurethane resin, polyester resin, acrylic resin, furan resin, cycloaliphatic epoxide, poly(glycidyl ether), polyepoxide resin, epoxy-functionalized resin, copolymers thereof, or any combination thereof. The resin, also referred to as a hardenable resin, typically includes one or more solvents. Exemplary solvents contained in the resin before being cured or hardened, can be or include, but are not limited to, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, isomers thereof, alky derivatives thereof, salts thereof, or any combination thereof.

The curing agent can be or include, but is not limited to, amine, tertiary amine, ethanolamine, benzyl dimethylamine, cycloaliphatic amine, amidoamine, aliphatic amine, aromatic amine, isophorone, isophorone diamine, polyamide, boron trifluoride, imidazole, imidazoline, mercaptan, sulfide, hydrazide, amide, salts thereof, or any combination thereof. For example, the curing agent can be or include, but is not limited to, piperidine, triethylamine, benzyldimethylamine, N,N-dimethylaminopyridine, 2-(N,N-dimethylaminomethyl) phenol, tris(dimethylaminomethyl) phenol, alky derivatives thereof, salts thereof, or any combination thereof.

In one or more examples, the coating fluid includes a two-component resin system that contains a curable resin and a curing agent. For example, the resin is a curable bisphenol A resin, commercially available as EXPEDITE® 225A resin, and the curing agent is an amine-containing curing agent, commercially available as EXPEDITE® 225B curing agent, both available from Halliburton Energy Services.

The surfactant can be or include, but is not limited to, one or more anionic surfactants, cationic surfactants, nonionic surfactants, amphoteric surfactants, or any combination thereof. For example, the surfactant can be or include one or more olefin sulfonates, such as one or a mixture of sodium $C_{14-16}$ olefin sulfonates, commercially available as Surfactant BIO-TERGE® AS 40 anionic surfactant from Stephan Company.

The organic solvent can be or include, but is not limited to, alcohols, glycols, glycol ethers, ethers, esters, alkanes, carboxylic acids (e.g., fatty acids), salts thereof, or any combination thereof. Exemplary alcohols can be or include, but is not limited to, methanol, ethanol, propanol, butanol, pentanol, hexanol, ethylhexanol, heptanol, benzyl alcohol, isomers thereof, alkyl derivatives thereof, salts thereof, ethers thereof, or any combination thereof. In some examples, the organic solvent is or includes 2-ethylhexanol, 2-butanol, iso-butanol, tert-butanol, iso-propanol, or any combination thereof.

The salt can be or include, but is not limited to, sodium chloride, potassium chloride, lithium chloride, calcium chloride, calcium carbonate, magnesium sulfate, and any combination thereof. The salt can be dissolved and/or combined with water or an aqueous solution to produce a brine. Natural salt water, such as seawater or ocean water, can also be included in the coating fluid as a source of brine. The brine can include about 1 wt %, about 2 wt %, about 5 wt %, about 8 wt %, or about 10 wt % to about 12 wt %, about 15 wt %, about 18 wt %, about 20 wt %, or more of the salt. For example, the brine can include about 1 wt % to about 20 wt %, about 1 wt % to about 15 wt %, about 1 wt % to about 10 wt %, about 1 wt % to about 5 wt %, about 5 wt % to about 20 wt %, about 5 wt % to about 15 wt %, about 5 wt % to about 10 wt %, about 5 wt % to about 12 wt %, or about 8 wt % to about 12 wt % of the salt.

The coating fluid can further contain or include a pH adjusting agent, such as one or more caustic or basic agents, one or more acidic agents, one or more buffer agents, or any combination thereof. The caustic or basic agent can be or include, but is not limited to, sodium hydroxide, potassium hydroxide, lithium hydroxide, ammonia, sodium hypochlorite, calcium hypochlorite, solutions thereof, or any combination thereof. The acidic agent can be or include, but is not limited to, hydrochloric acid, sulfuric acid, phosphoric acid, acetic acid, salts thereof, or any combination thereof. The coating fluid can have a pH from about 7.0 to about 10, about 9.5 to about 14, or about 4 to about 7.0. In one or more examples, the coating fluid contains one or more caustic agents and has a pH within a range from about 7.5 to about 14.

In one or more examples, the coating fluid contains about 15 wt % to about 60 wt % of the resin, about 10 wt % to about 40 wt % of the curing agent, about 5 wt % to about 20 wt % of the surfactant, about 5 wt % to about 20 wt % of the organic solvent, about 0.5 wt % to about 10 wt % of the salt, and/or about 0.5 wt % to about 20 wt % of the pH adjusting agent, based on the total weight of the coating fluid. For example, the coating fluid contains about 18 wt % to about 50 wt % of the resin, about 15 wt % to about 30 wt % of the curing agent, about 7 wt % to about 15 wt % of the surfactant, about 7 wt % to about 15 wt % of the organic solvent, about 0.8 wt % to about 8 wt % of the salt, and/or about 0.8 wt % to about 15 wt % of the pH adjusting agent, based on the total weight of the coating fluid. In other examples, the coating fluid contains about 20 wt % to about 40 wt % of the resin, about 18 wt % to about 25 wt % of the curing agent, about 8 wt % to about 12 wt % of the surfactant, about 8 wt % to about 12 wt % of the organic solvent, about 1 wt % to about 5 wt % of the salt, and/or about 1 wt % to about 10 wt % of the pH adjusting agent, based on the total weight of the coating fluid.

In another embodiment, the coating fluid contains a relative greater amount of surfactant and/or organic solvent than the aforementioned compositions. For example, the coating fluid contains about 5 wt % to about 25 wt % of the resin, about 2 wt % to about 20 wt % of the curing agent, about 15 wt % to about 65 wt % of the surfactant, about 15 wt % to about 65 wt % of the organic solvent, about 0.1 wt % to about 8 wt % of the salt, and/or about 1 wt % to about 20 wt % of the pH adjusting agent, based on the total weight of the coating fluid. In other examples, the coating fluid contains about 7 wt % to about 20 wt % of the resin, about 3 wt % to about 15 wt % of the curing agent, about 20 wt % to about 50 wt % of the surfactant, about 20 wt % to about 50 wt % of the organic solvent, about 0.2 wt % to about 6 wt % of the salt, and/or about 2 wt % to about 15 wt % of the pH adjusting agent, based on the total weight of the coating fluid. In further examples, the coating fluid contains about 8 wt % to about 15 wt % of the resin, about 4 wt % to about 10 wt % of the curing agent, about 25 wt % to about 40 wt % of the surfactant, about 25 wt % to about 40 wt % of the organic solvent, about 0.4 wt % to about 4 wt % of the salt, and/or about 3 wt % to about 10 wt % of the pH adjusting agent, based on the total weight of the coating fluid.

The coating fluid can include the surfactant and/or the organic solvent independently at a concentration in a range from about 5 wt % to about 250 wt %, based on a combined weight of the resin and the curing agent. In one or more examples, the coating fluid can independently have a concentration of the surfactant and/or the organic solvent in a range from about 8 wt % to about 30 wt %, about 10 wt % to about 25 wt %, or about 12 wt % to about 20 wt %, based on a combined weight of the resin and the curing agent. In other examples, the coating fluid can independently have a concentration of the surfactant and/or the organic solvent in a range from about 50 wt % to about 250 wt %, about 100 wt % to about 250 wt %, about 150 wt % to about 225 wt %, or about 180 wt % to about 200 wt %, based on a combined weight of the resin and the curing agent.

In one or more embodiments, the coating fluid can include one or more types of proppants. The proppant can be or include coated proppant, uncoated proppant, micro-proppant, macro-proppant, or any combination thereof. As used herein, a micro-proppant is a proppant that has an average particle size of 100 μm or less and a macro-proppant is a proppant that has an average particle size of greater than 100 μm. For example, the proppant can be or include a micro-proppant that has an average particle size in a range from about 0.1 μm, about 0.5 μm, about 1 μm, about 5 μm, about 10 μm, about 20 μm, or about 30 μm to about 50 μm, about 70 μm, about 80 μm, about 90 μm, or 100 μm. For example, the proppant can be or include a micro-proppant that has an average particle size in a range from about 0.1 μm to 100 μm, about 0.1 μm to 50 μm, about 1 μm to 100 μm, about 10 μm to 100 μm, or about 10 μm to 80 μm. In other example, the proppant can be or include a macro-proppant that has an average particle size in a range from greater than 100 μm, about 200 μm, about 500 μm, or about 700 μm to about 1 mm, about 2 mm, about 3 mm, about 4 mm, about 5 mm, or greater. For example, the proppant can be or include a macro-proppant that has an average particle size in a range from greater than 100 μm to about 5 mm, greater than 100 μm to about 3 mm, about 200 μm to about 2 mm, or about 200 μm to about 1 mm. The proppant can be, include, or contain, but is not limited to, sand, fly ash, glass, quartz, silica, silicate, silicon carbide, fumed silica, ceramic, alumina, hafnia, bauxite, graphite or carbon black, or any combination thereof.

EXAMPLES

In order to provide a better understanding of the foregoing discussion, the following non-limiting examples are offered. Although the examples can be directed to specific embodiments, they are not to be viewed as limiting the invention in any specific respect.

Example 1

Figure 3:
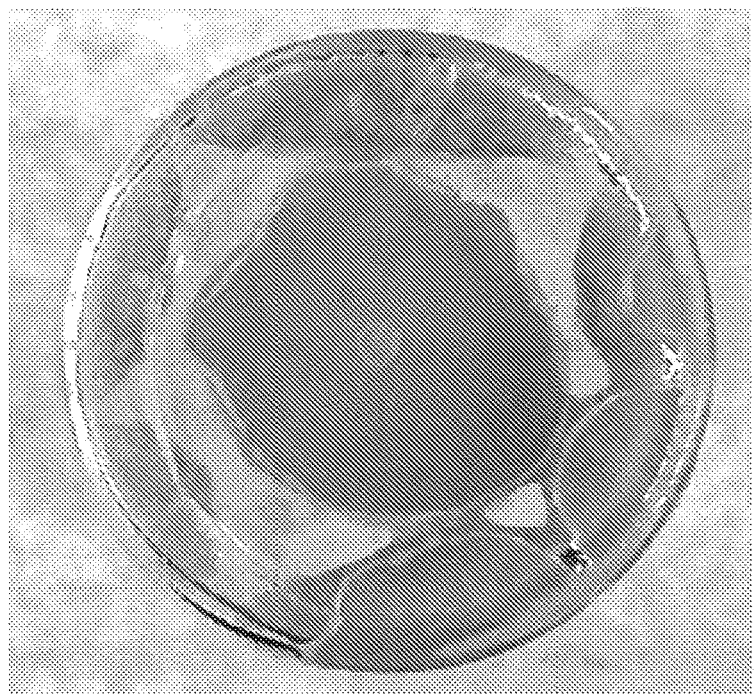
FIG. 3 is a pictorial representation of a polymeric coating containing conductive flow paths, according to one or more embodiments.

A coating fluid was prepared by combining together the following chemical components: 10% NaCl solution (90 wt % water), 40 wt % NaOH solution (60 wt % water), EXPEDITE® 225A bisphenol A curable resin, EXPEDITE® 225B amine curing agent, sodium $C_{14-16}$ olefin sulfonates (commercially available as Surfactant BIOTERGE® AS 40 anionic surfactant), and 2-ethylhexanol in the specified amounts listed in Table 1. The chemical components were combined and blended in a glass jar for about 5 minutes with a spatula to form the coating fluid. The glass jar containing the coating fluid was placed into a water bath and maintained at a temperature of about 160° F. (about 71° C.) for about 6 hours. Upon curing, a resin coating formed on the inner surface of the glass jar, as depicted in FIG. 3. The resin coating contains conductive flow paths (e.g., voids or channels) formed therein, as well as passing therethrough and between the resin coating and the bare surface of the glass jar.

TABLE 1

| Component | Amount (g) |
| --- | --- |
| 10 wt % NaCl solution | 2.15 |
| 40 wt % NaOH solution | 0.40 |
| bisphenol A curable resin | 3.22 |
| amine curing agent | 2.15 |
| olefin sulfonate anionic surfactant | 1.07 |
| 2-ethylhexanol | 1.07 |

Example 2

Figure 4:
FIG. 4 is a pictorial representation by scanning electron microscope (SEM) of another polymeric coating that contains conductive flow paths, according to one or more embodiments.

A coating fluid was prepared by combining together the following chemical components: 10% NaCl solution (90 wt % water), 40 wt % NaOH solution (60 wt % water), EXPEDITE® 225A bisphenol A curable resin, EXPEDITE® 225B amine curing agent, sodium $C_{14-16}$ olefin sulfonates (commercially available as Surfactant BIOTERGE® AS 40 anionic surfactant), and 2-ethylhexanol in the specified amounts listed in Table 2. The chemical components were combined and blended in a glass jar for about 5 minutes with a spatula to form the coating fluid. A sample of a flat face of a split Eagle Ford shale core (e.g., simulated fracture surface/face) was dipped in for the coating fluid to form a layer of the coating fluid on nucleation on the surface of the sample. After about 2 minutes of exposing the sample to the coating fluid, the sample was removed from the coating fluid. The treated split shale cores were placed into an oven and maintained at a temperature of about 200° F. (about 93° C.) for about 6 hours. Upon curing, a resin coating formed on the sample. A picture of the resin coating at a magnification of 40 times was taken with a scanning electron microscope (SEM), as depicted in FIG. 4. The resin coating on the shale core sample contains conductive flow paths (e.g., voids or channels) disposed between the clusters of the resin coating.

TABLE 2

| Component | Amount (g) |
| --- | --- |
| 10 wt % NaCl solution | 2.15 |
| 40 wt % NaOH solution | 4 |
| bisphenol A curable resin | 3.3 |
| amine curing agent | 2.15 |
| olefin sulfonate anionic surfactant | 10.47 |
| 2-ethylhexanol | 10.7 |

In one or more embodiments, the method for fracturing and stimulating a subterranean formation includes producing the resin coating on fracture nucleation surfaces of far field secondary fractures within the subterranean formation. The method includes introducing a pad fluid into a wellbore to form a primary fracture in the subterranean formation and introducing a coating fluid into the primary fracture to form secondary fractures in the subterranean formation. The method also includes flowing the coating fluid into the secondary fractures and exposing nucleation surfaces on the secondary fractures to the coating fluid and producing a resin coating on the nucleation surfaces. The resin coating contains conductive flow paths formed therein and passing or extending therethrough. The method further includes retrieving a hydrocarbon from the subterranean formation via the conductive flow paths within the secondary fractures. In one or more examples, the viscosity of the pad fluid is greater than the viscosity of the coating fluid and the coating fluid contains or includes one or more resins, one or more curing agents, one or more surfactants, and one or more organic solvents.

In other embodiments, the method includes forming a primary fracture in the subterranean formation by injecting a pad fluid into a wellbore extending into the subterranean formation and forming secondary fractures extending from the primary fracture and into the subterranean formation by injecting a coating fluid into the primary fracture. The method also includes exposing nucleation surfaces on the secondary fractures to the coating fluid and producing a resin coating on the nucleation surfaces. The resin coating contains conductive flow paths formed therein and extending or passing therethrough. The method further includes retrieving a hydrocarbon from the subterranean formation via the conductive flow paths within the secondary fractures. In one or more examples, the viscosity of the pad fluid is greater than the viscosity of the coating fluid, the viscosity of the coating fluid is in a range from about 1 cps to less than 20 cps, and the coating fluid contains or includes one or more resins, one or more curing agents, and one or more surfactants.

In other embodiments, the method includes injecting a coating fluid into a primary fracture to form secondary fractures in the subterranean formation, where the primary fracture is located in the subterranean formation and contains a pad fluid. The method also includes exposing nucleation surfaces on the secondary fractures to the coating fluid and producing a resin coating on the nucleation surfaces. The resin coating contains conductive flow paths formed therein and extending or passing therethrough. The method further includes retrieving a hydrocarbon from the subterranean formation via the conductive flow paths within the secondary fractures. In one or more examples, the viscosity of the pad fluid is greater than the viscosity of the coating fluid, the coating fluid contains or includes one or more resins, one or more curing agents, one or more surfactants, one or more organic solvents, and one or more types of proppants, and the proppant is or includes micro-proppant having an average particle size in a range from about 0.1 μm to 100 μm.

In addition to the embodiments described above, embodiments of the present disclosure further relate to one or more of the following paragraphs:

1. A method for producing a coating on one or more fracture surfaces within a subterranean formation, comprising: introducing a pad fluid into a wellbore to form a primary fracture in the subterranean formation; introducing a coating fluid into the primary fracture to form secondary fractures in the subterranean formation; flowing the coating fluid into the secondary fractures and exposing nucleation surfaces on the secondary fractures to the coating fluid; producing a resin coating on the nucleation surfaces, wherein the resin coating contains conductive flow paths formed therein; wherein a viscosity of the pad fluid is greater than a viscosity of the coating fluid; and wherein the coating fluid comprises a resin, a curing agent, a surfactant, and an organic solvent.

2. A method for producing a coating on one or more fracture surfaces within a subterranean formation, comprising: forming a primary fracture in the subterranean formation by injecting a pad fluid into a wellbore extending into the subterranean formation; forming secondary fractures extending from the primary fracture and into the subterranean formation by injecting a coating fluid into the primary fracture; exposing nucleation surfaces on the secondary fractures to the coating fluid; producing a resin coating on the nucleation surfaces, wherein the resin coating contains conductive flow paths extending therethrough; retrieving a hydrocarbon from the subterranean formation via the conductive flow paths within the secondary fractures; wherein a viscosity of the pad fluid is greater than a viscosity of the coating fluid; wherein the viscosity of the coating fluid is in a range from about 1 cps to less than 20 cps; and wherein the coating fluid comprises a resin, a curing agent, and a surfactant.

3. A method for producing a coating on one or more fracture surfaces within a subterranean formation, comprising: injecting a coating fluid into a primary fracture within the subterranean formation to form secondary fractures in the subterranean formation, wherein the primary fracture contains a pad fluid; exposing nucleation surfaces on the secondary fractures to the coating fluid; producing a resin coating on the nucleation surfaces, wherein the resin coating contains conductive flow paths extending therethrough; retrieving a hydrocarbon from the subterranean formation via the conductive flow paths within the secondary fractures; wherein a viscosity of the pad fluid is greater than a viscosity of the coating fluid; wherein the coating fluid comprises a resin, a curing agent, a surfactant, an organic solvent, and a proppant; and wherein the proppant comprises micro-proppant having an average particle size in a range from about 0.1 μm to 100 μm. One or more wellbores may extend into the subterranean formation.

4. The method according to any one of paragraphs 1-3, wherein the viscosity of the pad fluid is in a range from about 50 cps to about 10,000 cps.

5. The method according to any one of paragraphs 1-4, wherein the viscosity of the coating fluid is in a range from about 1 cps to less than 20 cps.

6. The method according to any one of paragraphs 1-5, wherein the viscosity of the pad fluid is in a range from about 100 cps to about 2,000 cps, and wherein the viscosity of the coating fluid is in a range from about 1 cps to about 18 cps.

7. The method according to any one of paragraphs 1-6, further comprising retrieving a hydrocarbon from the subterranean formation via the conductive flow paths formed in the resin coating within the secondary fractures, wherein the hydrocarbon is retrieved by flowing the hydrocarbon from the subterranean formation, through the conductive flow paths, and out of the wellbore.

8. The method according to any one of paragraphs 1-7, wherein the resin comprises phenol-formaldehyde, urea-formaldehyde, bisphenol A-epichlorohydrin resin, bisphenol F-epichlorohydrin, a polyepoxide resin, or any combination thereof.

9. The method according to any one of paragraphs 1-8, wherein the resin comprises bisphenol A, bisphenol F, phenol-aldehyde resin, urea-aldehyde resin, epichlorohydrin, novolac resin, polyurethane resin, polyester resin, acrylic resin, furan resin, cycloaliphatic epoxide, poly(glycidyl ether), epoxy-functionalized resin, copolymers thereof, or any combination thereof.

10. The method according to any one of paragraphs 1-9, wherein the curing agent comprises tertiary amine, ethanolamine, benzyl dimethylamine, cycloaliphatic amine, amidoamine, aliphatic amine, aromatic amine, isophorone, isophorone diamine, polyamide, boron trifluoride, imidazole, imidazoline, mercaptan, sulfide, hydrazide, amide, salts thereof, or any combination thereof.

11. The method according to any one of paragraphs 1-10, wherein the coating fluid comprises about 20 wt % to about 40 wt % of the resin, about 18 wt % to about 25 wt % of the curing agent, about 8 wt % to about 12 wt % of the surfactant, and about 8 wt % to about 12 wt % of the organic solvent, based on the total weight of the coating fluid.

12. The method according to any one of paragraphs 1-11, wherein the coating fluid comprises about 8 wt % to about 15 wt % of the resin, about 4 wt % to about 10 wt % of the curing agent, about 25 wt % to about 40 wt % of the surfactant, and about 25 wt % to about 40 wt % of the organic solvent, based on the total weight of the coating fluid.

13. The method according to any one of paragraphs 1-12, wherein the coating fluid comprises about 20 wt % to about 40 wt % of the resin, about 18 wt % to about 25 wt % of the curing agent, about 8 wt % to about 12 wt % of the surfactant, about 8 wt % to about 12 wt % of the organic solvent, about 1 wt % to about 5 wt % of the salt, and about 1 wt % to about 10 wt % of the pH adjusting agent, based on the total weight of the coating fluid.

14. The method according to any one of paragraphs 1-13, wherein the coating fluid comprises about 8 wt % to about 15 wt % of the resin, about 4 wt % to about 10 wt % of the curing agent, about 25 wt % to about 40 wt % of the surfactant, about 25 wt % to about 40 wt % of the organic solvent, about 0.4 wt % to about 4 wt % of the salt, and about 3 wt % to about 10 wt % of the pH adjusting agent, based on the total weight of the coating fluid.

15. The method according to any one of paragraphs 1-14, wherein the coating fluid contains the surfactant at a concentration in a range from about 5 wt % to about 250 wt %, based on a combined weight of the resin and the curing agent.

16. The method according to any one of paragraphs 1-15, wherein the surfactant comprises one or more anionic surfactants, cationic surfactants, nonionic surfactants, amphoteric surfactants, or any combination thereof.

17. The method according to any one of paragraphs 1-16, wherein the surfactant comprises one or more olefin sulfonates.

18. The method according to any one of paragraphs 1-17, wherein the surfactant comprises sodium sulfonates.

19. The method according to any one of paragraphs 1-18, wherein the organic solvent comprises methanol, ethanol, propanol, butanol, pentanol, hexanol, ethylhexanol, heptanol, benzyl alcohol, isomers thereof, alkyl derivatives thereof, salts thereof, ethers thereof, or any combination thereof.

20. The method according to any one of paragraphs 1-19, wherein the coating fluid further comprises water and a salt selected from the group consisting of sodium chloride, potassium chloride, lithium chloride, calcium chloride, calcium carbonate, magnesium sulfate, and any combination thereof.

21. The method according to any one of paragraphs 1-20, wherein the coating fluid further comprises a caustic agent and has a pH within a range from about 7.5 to about 14.

22. The method according to any one of paragraphs 1-21, wherein the hydrocarbon is retrieved from the subterranean formation by flowing the hydrocarbon from the subterranean formation, through the conductive flow paths, and out of the wellbore.

23. The method according to any one of paragraphs 1-22 wherein the pad fluid is introduced into the wellbore at an injection pressure that is greater than the fracturing gradient of the subterranean formation to form the primary fracture.

24. The method according to any one of paragraphs 1-23, wherein the coating fluid is introduced into the wellbore at an injection pressure that is greater than the fracturing gradient of the subterranean formation to form the secondary fracture.

25. The method according to any one of paragraphs 1-24, wherein the secondary fractures start at faces of the primary fracture and extend into the subterranean formation.

26. The method according to any one of paragraphs 1-25, wherein the coating fluid further comprises a proppant.

27. The method according to paragraph 26, wherein the proppant comprises micro-proppant having an average particle size in a range from about 0.1 μm to 100 μm.

28. The method according to paragraph 26 or 27, wherein the proppant comprises macro-proppant having an average particle size in a range from greater than 100 μm to about 5 mm.

29. The method according to any one of paragraphs 26-28, wherein the proppant comprises sand, fly ash, glass, quartz, silica, silicate, silicon carbide, fumed silica, ceramic, alumina, hafnia, bauxite, graphite or carbon black, or any combination thereof.

30. A system for performing the method according to any one of paragraphs 1-29, the system comprising: a casing disposed in the wellbore; a mixer configured to produce at least one of the pad fluid or the coating fluid; and a pump configured to pump at least one of the pad fluid or the coating fluid into the subterranean formation through the casing.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

What is claimed is:

1. A method for producing a coating on a fracture surface within a subterranean formation, comprising:
   introducing a pad fluid into a wellbore to form a primary fracture in the subterranean formation;
   introducing a coating fluid comprising a resin, a curing agent, a surfactant, and an organic solvent into the primary fracture to form secondary fractures in the subterranean formation;
   flowing the coating fluid into the secondary fractures and exposing nucleation surfaces on the secondary fractures to the coating fluid;
   producing a resin coating on the nucleation surfaces from the resin, wherein the resin coating contains conductive flow paths formed therein; and
   propping open the secondary fractures with the resin coating;
   wherein a viscosity of the pad fluid is greater than a viscosity of the coating fluid.

2. The method of claim 1, wherein the viscosity of the pad fluid is in a range from about 50 cps to about 10,000 cps.

3. The method of claim 1, wherein the viscosity of the coating fluid is in a range from about 1 cps to less than 20 cps.

4. The method of claim 1, wherein the viscosity of the pad fluid is in a range from about 100 cps to about 2,000 cps, and wherein the viscosity of the coating fluid is in a range from about 1 cps to about 18 cps.

5. The method of claim 1, further comprising retrieving a hydrocarbon from the subterranean formation via the conductive flow paths formed in the resin coating within the secondary fractures, wherein the hydrocarbon is retrieved by flowing the hydrocarbon from the subterranean formation, through the conductive flow paths, and out of the wellbore.

6. The method of claim 1, wherein the resin comprises bisphenol A, bisphenol F, phenol-aldehyde resin, urea-aldehyde resin, epichlorohydrin, novolac resin, polyurethane resin, polyester resin, acrylic resin, furan resin, cycloaliphatic epoxide, poly(glycidyl ether), epoxy-functionalized resin, copolymers thereof, or any combination thereof.

7. The method of claim 1, wherein the curing agent comprises tertiary amine, ethanolamine, benzyl dimethylamine, cycloaliphatic amine, amidoamine, aliphatic amine, aromatic amine, isophorone, isophorone diamine, polyamide, boron trifluoride, imidazole, imidazoline, mercaptan, sulfide, hydrazide, amide, salts thereof, or any combination thereof.

8. The method of claim 1, wherein the coating fluid comprises about 20 wt % to about 40 wt % of the resin, about 18 wt % to about 25 wt % of the curing agent, about 8 wt % to about 12 wt % of the surfactant, and about 8 wt % to about 12 wt % of the organic solvent, based on the total weight of the coating fluid.

9. The method of claim 1, wherein the organic solvent comprises methanol, ethanol, propanol, butanol, pentanol, hexanol, ethylhexanol, heptanol, benzyl alcohol, isomers thereof, alkyl derivatives thereof, salts thereof, ethers thereof, or any combination thereof.

10. The method of claim 1, wherein the coating fluid further comprises water and a salt selected from the group consisting of sodium chloride, potassium chloride, lithium chloride, calcium chloride, calcium carbonate, magnesium sulfate, and any combination thereof.

11. The method of claim 1, wherein the coating fluid further comprises a caustic agent and has a pH within a range from about 7.5 to about 14.

12. The method of claim 1, wherein the pad fluid is introduced into the wellbore at an injection pressure that is greater than the fracturing gradient of the subterranean formation to form the primary fracture.

13. The method of claim 1, wherein the coating fluid is introduced into the wellbore at an injection pressure that is greater than the fracturing gradient of the subterranean formation to form the secondary fracture.

14. The method of claim 1, wherein the secondary fractures start at faces of the primary fracture and extend into the subterranean formation.

15. The method of claim 1, wherein the coating fluid excludes proppant.

16. The method of claim 1, wherein the coating fluid further comprises a micro-proppant having an average particle size in a range from about 0.1 μm to 100 μm, and wherein the proppant comprises macro-proppant having an average particle size in a range from greater than 100 μm to about 5 mm.

17. The method of claim 1, wherein the coating fluid further comprises a proppant comprising sand, fly ash, glass, quartz, silica, silicate, silicon carbide, fumed silica, ceramic, alumina, hafnia, bauxite, graphite or carbon black, or any combination thereof.

18. A system for performing the method of claim 1, the system comprising:
   a casing disposed in the wellbore;
   a mixer configured to produce at least one of the pad fluid or the coating fluid; and
   a pump configured to pump at least one of the pad fluid or the coating fluid into the subterranean formation through the casing.

19. A method for producing a coating on a fracture surface within a subterranean formation, comprising:

forming a primary fracture in the subterranean formation by injecting a pad fluid into a wellbore extending into the subterranean formation;

forming secondary fractures extending from the primary fracture and into the subterranean formation by injecting a coating fluid comprising a resin, a curing agent, and a surfactant into the primary fracture;

exposing nucleation surfaces on the secondary fractures to the coating fluid;

producing a resin coating on the nucleation surfaces from the resin, wherein the resin coating contains conductive flow paths extending therethrough;

propping open the secondary fractures with the resin coating;

retrieving a hydrocarbon from the subterranean formation via the conductive flow paths within the secondary fractures;

wherein a viscosity of the pad fluid is greater than a viscosity of the coating fluid;

wherein the viscosity of the coating fluid is in a range from about 1 cps to less than 20 cps.

20. A method for producing a coating on a fracture surface within a subterranean formation, comprising:

injecting a coating fluid comprising a resin, a curing agent, a surfactant, and an organic solvent into a primary fracture within the subterranean formation to form secondary fractures in the subterranean formation, wherein the primary fracture contains a pad fluid;

exposing nucleation surfaces on the secondary fractures to the coating fluid;

producing a resin coating on the nucleation surfaces from the resin, wherein the resin coating contains conductive flow paths extending therethrough;

propping open the secondary fractures with the resin coating;

retrieving a hydrocarbon from the subterranean formation via the conductive flow paths within the secondary fractures;

wherein a viscosity of the pad fluid is greater than a viscosity of the coating fluid.

* * * * *